United States Patent
Bach et al.

(10) Patent No.: US 9,678,369 B2
(45) Date of Patent: Jun. 13, 2017

(54) TERMINATING IMPEDANCE CIRCUIT FOR AN ELECTROABSORPTION MODULATOR

(71) Applicant: Fraunhofer-Gesellschaft zur Foerderung der angewandten Forschung e.V., Munich (DE)

(72) Inventors: Heinz-Gunter Bach, Berlin (DE); Martin Moehrle, Berlin (DE); Georges Przyrembel, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 15/074,737

(22) Filed: Mar. 18, 2016

(65) Prior Publication Data

US 2016/0202501 A1   Jul. 14, 2016

Related U.S. Application Data

(63) Continuation of application No. PCT/EP2014/068982, filed on Sep. 5, 2014.

(30) Foreign Application Priority Data

Sep. 19, 2013 (DE) .......... 10 2013 218 859

(51) Int. Cl.
- *G02B 6/00* (2006.01)
- *G02F 1/15* (2006.01)
- *G02F 1/015* (2006.01)

(52) U.S. Cl.
CPC ...... *G02F 1/015* (2013.01); *G02F 2001/0155* (2013.01)

(58) Field of Classification Search
CPC ................. G02B 6/00; G02F 1/015
(Continued)

(56) References Cited

U.S. PATENT DOCUMENTS

| | | | |
|---|---|---|---|
| 5,532,512 A * | 7/1996 | Fillion et al. | 257/686 |
| 6,437,899 B1 * | 8/2002 | Noda | 359/245 |
| 2004/0027633 A1 * | 2/2004 | Miller et al. | 359/240 |

OTHER PUBLICATIONS

Li, G. L. et al., "Ultrahigh-Speed Traveling-Wave Electroabsorption Modulator-Design and Analysis", IEEE Transactions on Microwave Theory and Techniques, IEEE Service Center, Piscataway, NJ, US, vol. 47, No. 7,, Jul. 1, 1999, pp. 1177-1784.

(Continued)

*Primary Examiner* — Kaveh C Kianni
(74) *Attorney, Agent, or Firm* — Perkins Coie LLP; Michael A. Glenn

(57) ABSTRACT

A terminating impedance circuit, which is thermally decoupled from a substrate, for an electroabsorption modulator, having a modulator capacitance includes a series resistance-emphasized RF delay line exhibiting an impedance distributed over its length, wherein the spatially distributed impedance has at least a predominant resistance per unit length, an inductance per unit length tuned to the modulator capacitance, and a parasitic capacitance per unit length, wherein the resistance per unit length takes the function of a terminating resistor, wherein furthermore the inductance per unit length, together with the modulator capacitance, forms a strongly damped resonant circuit which provides, together with the terminating impedance circuit, for a controlled increase in the frequency response of the electroabsorption modulator within an operating frequency range, and wherein, at least for radio-frequency signals, the parasitic capacitance per unit length is negligible relative to the modulator capacitance.

13 Claims, 7 Drawing Sheets

(58) Field of Classification Search
USPC .............................................................. 385/2
See application file for complete search history.

(56) References Cited

OTHER PUBLICATIONS

Schlafer, John et al., "Microwave Packaging of Optoelectronic Components", IEEE Transactions on Microwave Theory and Techniques, IEEE Service Center, Piscataway, NJ, US, vol. 38, No. 5, May 1, 1990, pp. 518-523.
Zhu, N. H. et al., "Electrical and Optical Coupling in an Electroabsorption Modulator Integrated with da DFB Laser", IEEE Journal, Jul. 1, 2007, pp. 535-544.

* cited by examiner

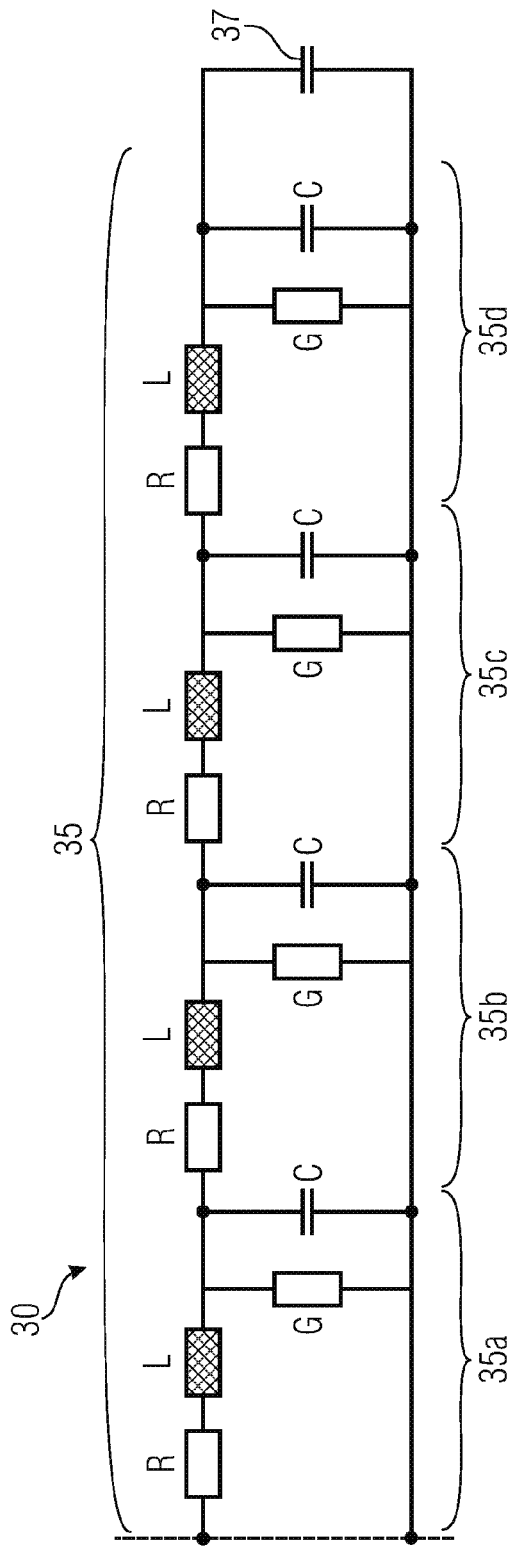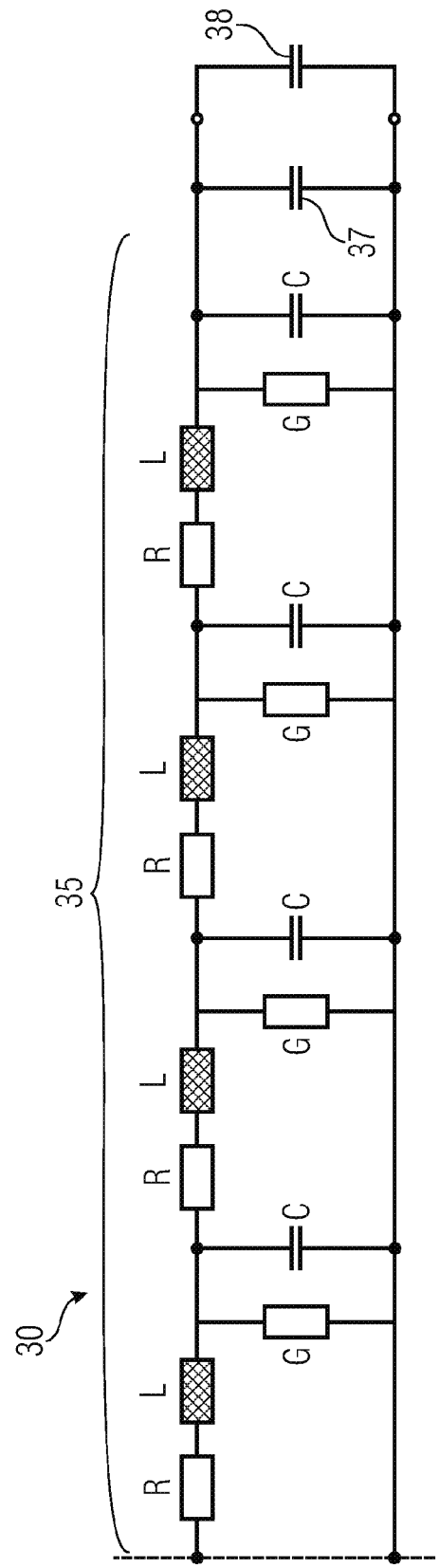
FIGURE 4
FIGURE 5

TERMINATING IMPEDANCE CIRCUIT FOR AN ELECTROABSORPTION MODULATOR

CROSS-REFERENCE TO RELATED APPLICATIONS

This application is a continuation of copending International Application No. PCT/EP2014/068982, filed Sep. 5, 2014, which is incorporated herein by reference in its entirety, and additionally claims priority from German Application No. 10 2013 218 859.5, filed Sep. 19, 2013, which is incorporated herein by reference in its entirety.

Embodiments of the present invention relate to a terminating impedance circuit for an electroabsorption modulator. Further embodiments relate to a method for electrically terminating an electroabsorption modulator. Some embodiments relate to a frequency-increasing drive wiring for electroabsorption modulators in an integrated form.

BACKGROUND OF THE INVENTION

Optical modulators by means of which a light beam may be modulated are, among other things, employed in optical telecommunications. The light beam may be transmitted through free space or through a light guide, such as, for example, a glass fiber. Electroabsorption modulators are optical modulators which may be used for modulating the intensity of a laser beam by means of an electric voltage. The electric field within the electroabsorption modulator causes a change in the absorption spectrum, which in turn changes the band gap energy (and thus the photon energy of an absorption edge).

An electroabsorption modulator may be considered to be an electro-optical transducer which converts an electric signal to a corresponding modulation of a light beam or laser beam. The electric signal may, in particular, be a radio-frequency (RF) signal which is transmitted as an input signal to the electroabsorption modulator via a suitable line and a suitable terminal. Since in most cases the impedance of the electroabsorption modulator is not identical to the characteristic impedance of the line, a terminating resistor or terminating impedance may be provided which is mostly electrically connected in parallel to the electroabsorption modulator in order for the overall impedance of the corresponding parallel connection of the electroabsorption modulator and the terminating impedance circuit to be similar to the characteristic impedance of the line. In this way, reflections at the interface between the line and the electroabsorption modulator may be largely avoided.

Some approaches for wiring electroabsorption modulators (EAMs) make use of several and discretely realized electric components (such as, e.g., ohmic resistors and idealized delay line (L, C portions). Usually a hybrid setup is described and used in a technological realization. The term "hybrid setup" here refers to the spatially closely neighboring arrangement of a semiconductor chip and the EAM and a dielectric substrate with a line arrangement and, maybe, further passive components.

When realizing a radio-frequency circuit comprising discrete electric components, typically the impedance values of a circuit may be only of a limited precision, except the circuit is tuned to the desired impedance value in a manual and complicated manner. One possible reason for the limited precision may be that the electric connections (such as, e.g., solder connections) between the discrete components and the circuit board and the bond wire connections may be subject to relatively large variations with regard to their impedance values.

Furthermore, in particular in discrete ohmic resistors, the electric power is implemented within a relatively small space. This may result in a local concentrated heating of the circuit, i.e. in direct proximity to the discrete ohmic resistor. The heat generated by the ohmic resistor has to be dissipated on the one hand and, on the other hand, the corresponding change in temperature in turn may influence the impedance values of the discrete components, which may result in an additional variation of the impedance values of the entire circuit.

Consequently, the object underlying the present invention is providing a terminating impedance circuit which exhibits high precision and stability with regard to its impedance values. Another aspect of the invention is realizing the electric circuit described while avoiding an additional thermal stress for the EML (electroabsorption modulator integrated laser) despite the spatial proximity to the EAM, which is desirable from an RF-technological point of view. This may exemplarily be achieved by using a suitable dielectric in combination with the meandering implementation of the electric line. However, without such thermal decoupling, such an integration of the EML and the terminating impedance circuit would frequently not be practical.

SUMMARY

According to an embodiment, a device may have: an electroabsorption modulator including a modulator capacitance, and a terminating impedance circuit connected in parallel to the electroabsorption modulator; wherein the terminating impedance circuit includes an RF delay line having an impedance distributed over its length, wherein the spatially distributed impedance includes a resistance per unit length, an inductance per unit length, and a parasitic capacitance per unit length, wherein the resistance per unit length and the line length of the RF delay line define a desired terminating impedance for the electroabsorption modulator, wherein the inductance per unit length and the line length of the RF delay line are selected to define, together with the modulator capacitance of the electroabsorption modulator, a damped resonant circuit system having a resonance frequency at a predefined value below an upper operating frequency limit of the electroabsorption modulator, thereby causing a controlled increase in the frequency response of the electroabsorption modulator within an operative frequency range, wherein the RF delay line is implemented to be a strip line, and wherein the RF delay line exhibits the following parameters:—resistance per unit length between 20 kohm/m and 200 kohm/m,—inductance per unit length between 100 nH/m and 1000 nHm,—leakage per unit length smaller than 20 mS/mm, and—capacitance per unit length between 10 pF/m and 200 pF/m.

Embodiments of the present invention provide a terminating impedance circuit for an electroabsorption modulator. The electroabsorption modulator comprises a modulator capacitance. The terminating impedance circuit includes a series resistance-emphasized RF delay line having an impedance distributed over its length, wherein the spatially distributed impedance comprises at least a predominant resistance per unit length, an inductance per unit length tuned to the modulator capacitance, and a parasitic capacitance per unit length. The resistance per unit length takes the function of a terminating resistor. The inductance per unit length forms, in combination with the modulator capacitance, a strongly damped resonant circuit system which, in combination with the terminating impedance circuit, provides for a controlled increase in the frequency response of the electroabsorption modulator within an operating frequency range. The parasitic line capacitance per unit length is, at least for radio-frequency signals, negligible relative to the modulator capacitance. Series resistance-emphasized (accentuated series resistance) here means that the series resistance in the equivalent circuit diagram of the RF delay line has considerable influence on the line impedance appearing at its input.

Further embodiments provide a method for electrically terminating an electroabsorption modulator. In accordance with the method, a terminating impedance circuit is connected to the electroabsorption modulator. The terminating impedance circuit includes a series resistance-emphasized RF delay line having an impedance distributed over its length. The distributed impedance comprises at least a predominant resistance per unit length, an inductance per unit length tuned to the modulator capacitance, and a parasitic capacitance per unit length. The resistance per unit length has the function of a terminating resistor. The inductance per unit length forms, in combination with the capacitance of the electroabsorption modulator, a strongly damped resonant circuit which, in combination with the terminating impedance circuit, provides for a controlled increase in the frequency response of the electroabsorption modulator within an operating frequency range. At least for radio-frequency signals, the parasitic capacitance per unit length is negligible relative to the modulator capacitance.

The present invention makes use of the fact that an RF delay line may be dimensioned such that the spatially distributed resistance per unit length of the RF delay line may be used instead of a discretely realized ohmic terminating resistance. The discrete ohmic terminating resistor becomes unnecessary in many cases. The resistance per unit length of the RF delay line may be kept to relatively precisely during manufacturing, since the RF delay line may exemplarily be manufactured using lithographic techniques. A solder connection or a comparable connection to a conventional discretely realized ohmic terminating resistor, which, with regard to its impedance values, is difficult to manufacture with sufficient precision, is not necessary. The invention is also based on a special tuning of the different portions of the distributed impedance, in particular with regard to the predominant resistance per unit length and inductance per unit length.

In contrast to well-known terminating resistors, the solution presented here entails using a delay line containing all possible electric basic components (R, L, G, C). These basic components may also be detected when modeling the terminating impedance circuit. Using the series resistance-emphasized RF delay line mentioned above, the R and L components which may be primarily used for optimization may be realized together in a single structure.

In some embodiments, the technological realization of the terminating impedance circuit may be directly on a modulator chip on which the electroabsorption modulator is also implemented with a laser (or laser source). In this case, the terminating impedance circuit is integrated monolithically with the electroabsorption modulator. This monolithic realization may be cheaper and more reliable than a hybrid structure that may be used in addition to the modulator chip.

Furthermore, the monolithic solution may, at least in some embodiments, be more precise and more broad-banded than an external hybrid setup. In some embodiments, its elongate shape may effect heat dissipation of the distributed terminating resistor favorably.

In some embodiments, a dielectric of a larger or smaller thickness which insulates the series resistance-emphasized RF delay line both electrically and thermally may decouple the increase in temperature in the distributed terminating resistor from the laser and the modulator on the same chip. Due to an elongate shape of the RF delay line, heat developing may be distributed advantageously to a larger space.

BRIEF DESCRIPTION OF THE DRAWINGS

Embodiments of the present invention will be detailed subsequently referring to the appended drawings, in which:

FIG. 4 schematically shows another variation of a terminating impedance circuit in accordance with embodiments, wherein the terminating impedance circuit includes an RF delay line comprising a terminating, monolithically integrated capacitor;

FIG. 5 schematically shows another variation of a terminating impedance circuit in accordance with embodiments, the terminating impedance circuit including an RF delay line comprising a terminating, monolithically integrated capacitor and an external capacitor;

DETAILED DESCRIPTION OF THE INVENTION

Figure 1:
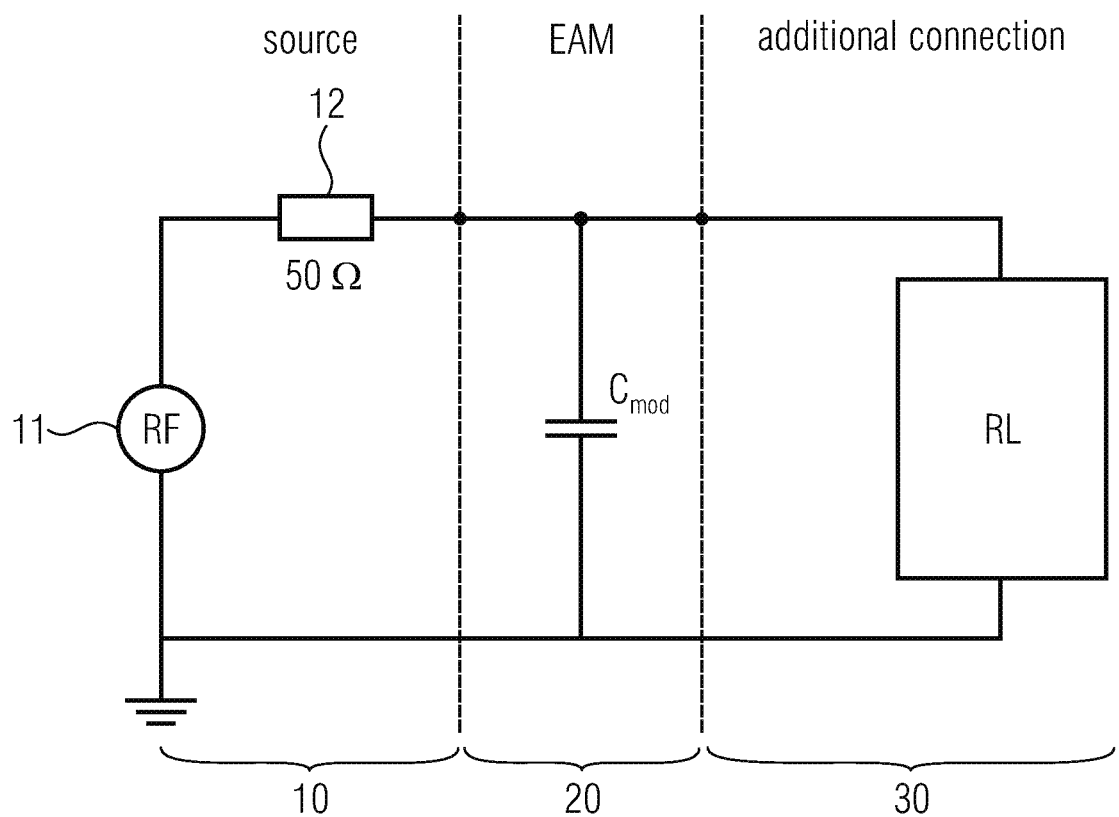
FIG. 1 schematically shows a small-signal equivalent circuit diagram of an electroabsorption modulator comprising a driving source and terminating impedance circuit.

In the following description of embodiments of the invention, same elements or elements of equal effect in the figures are provided with same reference numerals, so that the description thereof in the different embodiments is mutually exchangeable.

FIG. 1 schematically shows a simplified small-signal equivalent circuit diagram of an electroabsorption modulator 20 (EAM) comprising a driving source 10 and a terminating impedance circuit 30. In the example illustrated, the driving source 10 has been considered to be an ideal voltage source 11 and an internal resistor 12 of 50 ohm. The electroabsorption modulator 20 may, in a simplified manner, be represented by a capacitor $C_{mod}$. The terminating impedance circuit or additional wiring 30 mainly exhibits an ohmic (R) and inductive (L) behavior and typically has the object of avoiding reflections from the electroabsorption modulator 20 back to the source 10. Another object of the terminating impedance circuit may be power matching between the source 10 and the electroabsorption modulator 20 and additionally a slight increase in frequency response of the overall device, distributed in the frequency range.

FIGS. 2 to 5 show schematic equivalent circuit diagrams for different variations of the terminating impedance circuit.

Figure 2:
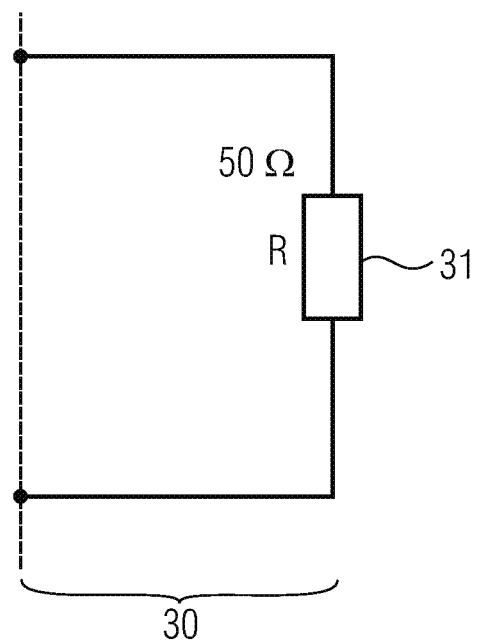
FIG. 2 schematically shows a variation for the terminating impedance circuit, the terminating impedance circuit including an ohmic resistor realized as a discrete component.

FIG. 2 shows a terminating resistor 31 of 50 ohm, as is used in conventional technology. Due to its heat generation, the terminating resistor is usually realized to be a discrete component, so that the overall circuit of an electroabsorption modulator 20 and a terminating impedance circuit 30 is implemented as a hybrid circuit.

Figure 3:
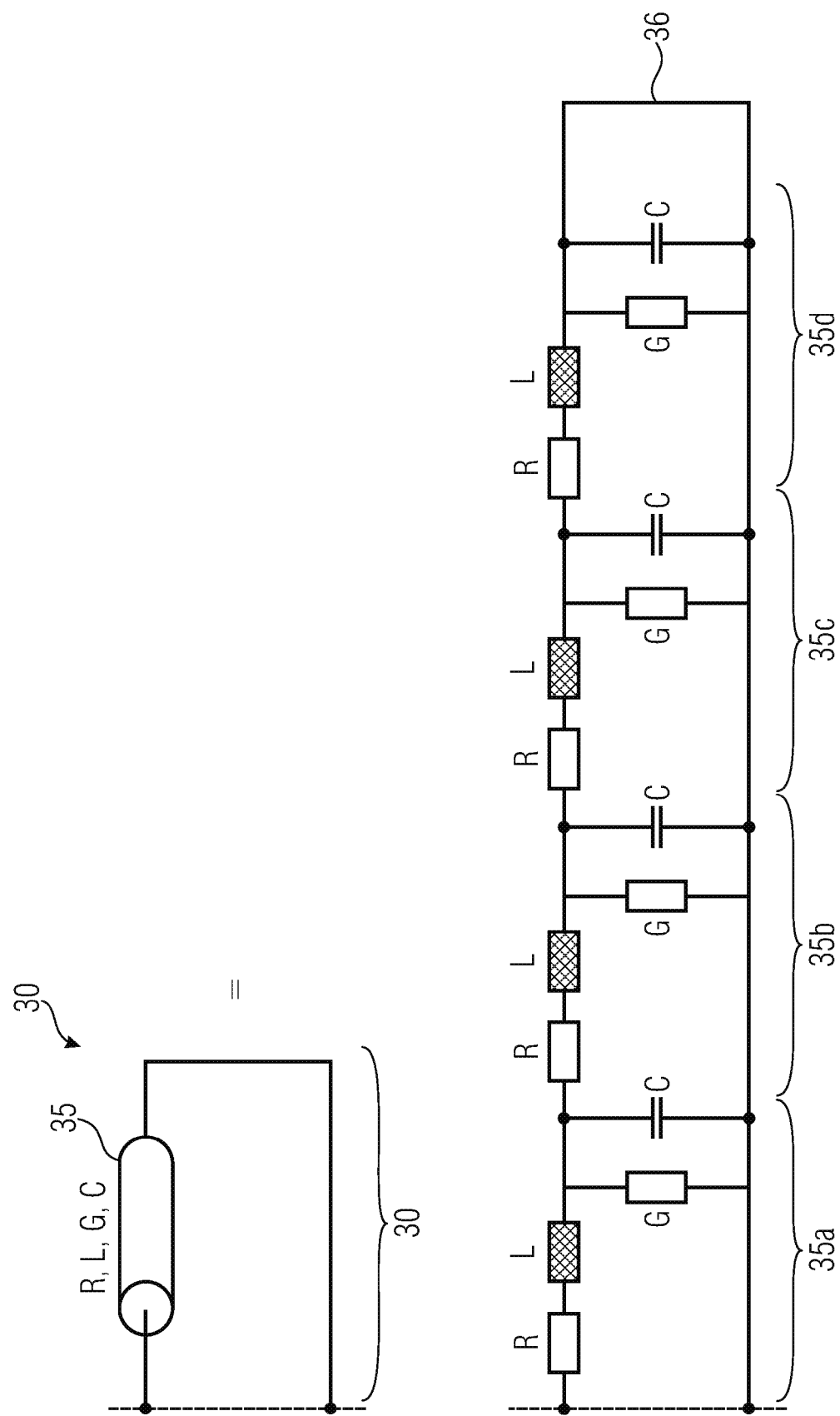
FIG. 3 schematically shows another variation of a terminating impedance circuit in accordance with embodiments, wherein the terminating impedance circuit includes an RF delay line with a terminating short circuit.

FIG. 3 shows a terminating impedance circuit in accordance with embodiments of the present invention. The terminating impedance circuit 30 includes an RF delay line 35. The RF delay line 35 may in reality be implemented to be a strip line on the chip, on which the electroabsorption modulator 20 is also implemented. For simulation purposes, the RF delay line 35 may exemplarily be modeled by chain-connecting several two-ports 35a, 35b, 35c and 35d. On the output side, the RF delay line 35 may, as is the case in the embodiment illustrated in FIG. 3, be short-circuited by a short-circuit 36. The short-circuit 36 may also be implemented directly on the chip of the electroabsorption modulator 20. The two-ports 35a, 35b, 35c and 35d each include an ohmic series resistor R, a line inductor L, an insulation value (leakage value) G and a line capacitor C.

In accordance with some embodiments, the series resistance-emphasized RF delay line 35 may include an input terminal connected to the electroabsorption modulator 20. At least for radio-frequency signals, the RF delay line 35 may include an output-side short-circuit. The series resistance-emphasized RF delay line 35 and the output-side short-circuit may be integrated monolithically or be implemented together as a monolithic microwave circuit.

The RF delay line may be a series resistance-emphasized RF delay line having an impedance Z' distributed over its length. The spatially distributed impedance Z' comprises at least a predominant resistance per unit length R', an inductance per unit length L' tuned to the modulator capacitance $C_{mod}$ and a parasitic capacitance per unit length C'. The resistance per unit length R' takes the function of a terminating resistor. The inductance per unit length L', together with the modulator capacitance $C_{mod}$, forms a strongly damped resonant circuit system which, together with the terminating impedance circuit, provides for a controlled increase in the frequency response of the electroabsorption modulator within an operating frequency range. At least for radio-frequency signals, the parasitic capacitance per unit length C' is negligible relative to the modulator capacitance $C_{mod}$.

FIG. 4 shows an equivalent circuit diagram of a terminating impedance circuit 30 in accordance with another embodiment. The terminating impedance circuit 30 again includes an RF delay line 35 which is represented approximately by the two-port chain connection. An output-side capacitor 37 basically acts as a short-circuit, at least for radio-frequency signals or signal portions. The capacitor 37 may be formed on the chip of the electroabsorption modulator 20, so that the electroabsorption modulator 20 and the terminating impedance circuit 30 are integrated monolithically. In this case, the capacitor 37 will exhibit a relatively low capacitance which, however, basically acts as a short-circuit above a certain frequency. The specific design of the delay line in accordance with the variation shown in FIG. 4 typically results in an effective inductance in the place of the modulator, due to the inductive components L, and causes an increase in the frequency response compared to the standard case in accordance with FIG. 2 by cooperating with the capacitance $C_{mod}$ thereof. The output-side short-circuit may include an advantageously integrated capacitor or, in dependence on a lower cut-off frequency, several parallel capacitors (see FIG. 5).

The terminating impedance circuit 30 illustrated in FIG. 5 differs from FIG. 4 by an additional output-side capacitor 38 which may exemplarily be implemented as an external or discrete device. Thus, FIG. 5 shows a variation with an on-chip capacitance 37 in parallel to an external large capacitance to ground. The additional capacitor 38 may be dimensioned to be larger than a monolithically integrated capacitor 37, so that a short-circuit may be achieved in this way for signals or signal portions the frequency of which is above a relatively low cut-off frequency. The integrated capacitor 37, which is usually dimensioned to be smaller, may also be useful in the presence of the additional capacitor 38 dimensioned to be larger so as to allow the most precise behavior possible of the terminating impedance circuit 30, in particular in the relevant radio-frequency frequency range. In contrast to the integrated capacitor 37, the additional capacitor 38 is connected to the RF delay line via another line or connection (such as, for example, a bond-wire connection), wherein the scattering of bond-wire inductances will then be uncritical in the lower frequency range which is of importance here. In the variation in accordance with FIG. 5, direct current losses in the distributed line series resistance may be avoided, allowing the line to be implemented at a smaller capacitance and a broader band.

An integrated drive wiring 30 for electroabsorption modulators (EAMs) is suggested in accordance with some embodiments. On the one hand, same is to take the function of the conventional ohmic 50 ohm terminating resistor, wherein in this case it may be implemented on the modulator chip itself (in the form of the terminating impedance circuit suggested). In addition, this wiring may be designed to serve a specific increasing function of the frequency response. Using the line geometries, the wiring here may be dimensioned such that an effective inductance will be realized additionally at the position of the modulator electrodes. This inductance portion may form a pole location increasing the frequency response, together with the capacitance of the modulator itself.

On the level of an equivalent circuit diagram, the inventive wiring includes a lossy RF delay line, short-circuited, at least with regard to RF, at its end and is illustrated in different variations in FIGS. 3 to 5. The expression "lossy" is not to be understood to be derogatory, but means, compared to an ideal lossless delay line, the presence of the R and G components. In particular, the R component, together with the RF short-circuit at the line end, is used for forming an ohmic terminating resistor so as to meet the standard variation in accordance with FIG. 3.

At least some embodiments relate to the case in which a freely dimensionable lossy delay line 35 is used as an input wiring (or terminating impedance circuit) for electroabsorption modulators.

The specific dimensioning of the electric basic components (R, L, G, C) of the delay line provided allows several approaches of optimization, specifically with regard to the frequency response of the modulator component.

The distributed resistance component R of the line may be used for forming the conventional ohmic terminating resistance of, for example, 50 ohm (different values also being possible). It may be of advantage here for the thermal power loss occurring in operation also to be distributed over the electrode path of the RF delay line of a length of roughly 1 mm. This avoids local thermal overheating, as may otherwise occur in conventional small radio-frequency resistors.

The distributed inductive component of the line may partly compensate the self-capacitance of the modulator and may thus allow further considerable optimization and increase in the frequency response (increasing the 3 dB cut-off frequency from, for example, 24 GHz to 33 GHz).

The distribution of, in particular, the inductive longitudinal component in a line which exhibits a capacitance, in a controlled manner, to ground allows distributing the disadvantageous visible narrow-band resonant behavior observed in prior-art solutions, such as, for example, cascaded branch line resonances over a wide frequency range in a slightly increasing manner and thus ensuring a good impulse behavior with little or even very little reverberation.

The realization of the delay line provided here may advantageously be directly on the device chip of, for example, an electroabsorption modulator 20. However, this realization is not compelling and may also be implemented in a different technology.

Another variation provides for a change in width or width tapering of the line 35 in the geometrical planar realization in order to adjust the frequency response and electro-optical impulse behavior in an even more advantageous manner. In particular, the series resistance-emphasized RF delay line 35 may be of a cross-section or width increasing slightly in the direction of the back RF short-circuit so as to be of a particularly low-capacitance effect at the modulator terminal position. The possibility of line tapering in steps is to be included here.

The electroabsorption modulator 20 and the terminating impedance circuit 30 may be integrated monolithically or be implemented together as a monolithic microwave circuit. This may have favorable effects on the reproducibility of the parameters of a common circuit of the electroabsorption modulator 20 and the terminating impedance circuit 30. In particular, longer lines and/or special connections (such as, e.g., solder points and bond connections) between the individual components may be avoided in this way, which are usually relatively susceptible to parameter variations due to scattering when manufacturing.

The inductance per unit length L' may cause an effective inductance at the position of the electroabsorption modulator 20. In this way, a possible increase in the frequency response in a frequency range of interest has a favorable effect on the function of the electroabsorption modulator 20.

A resonance-distributed system which includes the electroabsorption modulator 20 and the series resistance-emphasized RF delay line 35, for broad-band applications, may advantageously be of a quality factor Q<1, which is related to a relatively broad-band increase in the frequency response distributed over the frequency space. In particular, such a resonance-distributed system which includes the electroabsorption modulator and the series resistance-emphasized RF delay line may exhibit a broad-band resonance behavior. Due to the broad-band resonance behavior, the electroabsorption modulator 20 may also be operated in a relatively broad-band manner.

The series resistance-emphasized RF delay line may be implemented to be a strip line. A strip line may be implemented directly on a chip or on a circuit board. The strip line may include a dielectric at a thickness between 0.1 μm and 10 μm (further possible ranges exemplarily being [0.1 μm . . . 5 μm]; [0.2 μm . . . 5 m]; [0.2 μm . . . 3 m]) and a relative permittivity $\in_r$ between 1.8 and 13 (further possible ranges exemplarily being [1.8 . . . 10]; [2 . . . 9]; or [3 . . . 8]).

The series resistance-emphasized RF delay line 35 may be of a meandering, serpentine or spiral implementation.

The series resistance-emphasized RF delay line 35 may comprise a length of at least 1/10 of the wavelength at the operating frequency limit of the modulator, such as, e.g., at least 400 μm for 40 GHz applications.

The series resistance-emphasized RF delay line may exhibit the following parameters:
  resistance per unit length (R') between 20 kohm/m and 200 kohm/m,
  inductance per unit length (L') between 100 nH/m and 1000 nHm,
  leakage per unit length (G') smaller than 20 mS/mm,
  capacitance per unit length (C') between 10 pF/M and 200 pF/m.

The series resistance-emphasized RF delay line may include at least one of the following materials: gold, titanium, platinum, silver, nickel, chromium and/or tungsten.

Dimensioning the series resistance-emphasized RF delay line may take place in accordance with at least one of the following provisions:
  tuning the resistance per unit length and line length to the desired terminating impedance, mostly around 50 ohm;
  tuning the inductance per unit length and length of the line in accordance with the Thomson resonant circuit equation together with the modulator capacitance $C_{mod}$ to be slightly below the upper operating frequency limit;
  tuning the length of the line in accordance with its signal speed to 1/8 . . . 1/4 of the upper operating limit frequency or respective wavelength, so that the line termination RF short-circuit is transformed to an open circuit at the modulator terminal;
  inductance and capacitance per unit length being tuned to the resistance per unit length such that the result is a damped distributed resonant behavior which results in a generally extended, but flat frequency course of the overall device. Tuning may also take place such that the result is a strongly damped or very strongly damped resonant behavior.
  keeping the capacitance per unit length, tuned to the line length, so small that the overall equivalent capacitance of the line relative to the modulator capacitance is still negligible;
  dimensioning the length and area of the RF delay line 35 with regard to the effective heat dissipation of the heat forming in the distributed termination line by at least the modulation signal alternating current power, the dielectric effectively keeping the heat developing away from the sensitive laser.

A real parameter optimization in accordance with the above provisions advantageously takes place as a method in the circuit simulator which maximizes the frequency course and minimizes the group delay scattering in the operating frequency range such that the result is a well-opened eye diagram in the time range behavior. Same could be verified up to 70 Gbits/s, which goes considerably beyond conventional technology at 40 Gbit/s for these laser-integrated modulators.

Dimensioning an integrated drive wiring or terminating impedance circuit 30 on a semiconductor chip of an electroabsorption modulator 20 is illustrated as an understandable embodiment. A drive wiring/terminating impedance circuit for an electroabsorption modulator, consisting of a microstrip line, has been developed for the specific embodiment suggested here.

Realizing the respective delay line is done in the form of, for example, an output-side microstrip line short-circuited in an RF manner. A finitely low-resistance terminal, fitting optimization of the frequency and impulse behavior as well as thermal stressability, may also be provided here.

Figure 6:
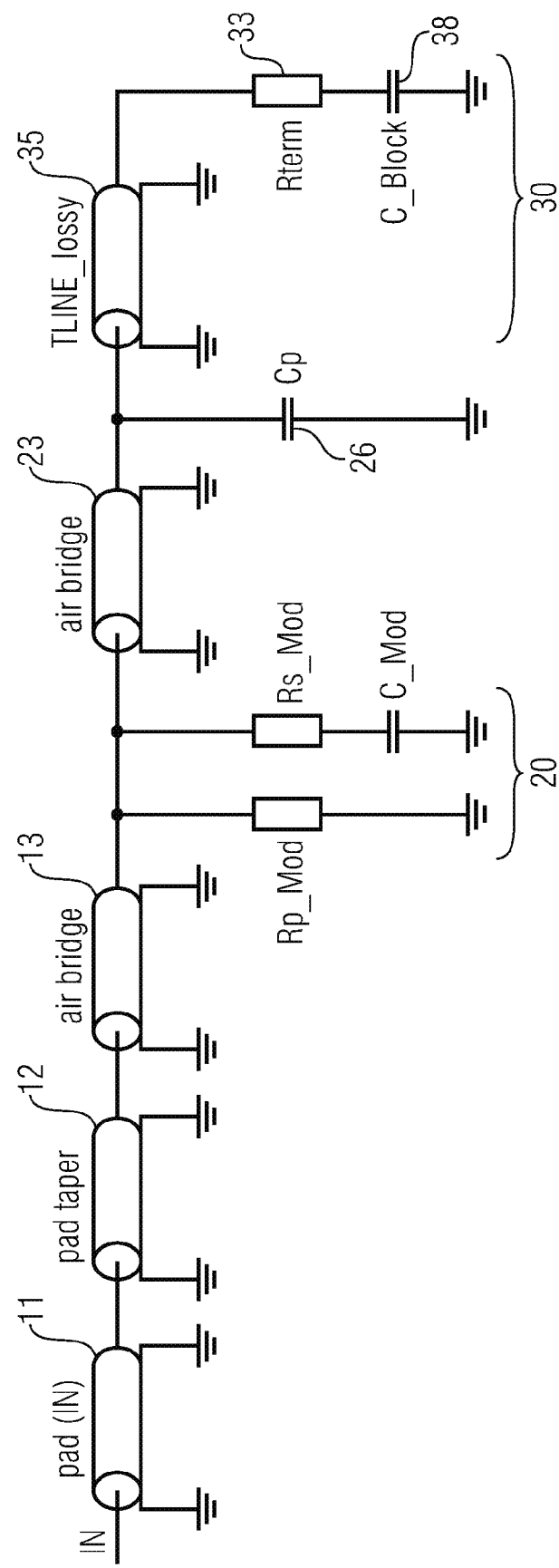
FIG. 6 shows a schematic equivalent circuit diagram of one way of realizing the entire circuit which includes an electroabsorption modulator, a terminating impedance circuit and some lines for electrically connecting the individual components.

FIG. 6 shows an electric equivalent circuit diagram of the overall circuit including an electroabsorption modulator, a terminating impedance circuit and electric lines. The electric equivalent circuit diagram of FIG. 6 may exemplarily be used for modeling, simulation and dimensioning. The source 10 is not illustrated, but is connected to the left terminal of the circuit illustrated. The electroabsorption modulator 20 here is represented approximately by a parallel resistor Rp_Mod, a second resistor Rs_Mod and a capacitor CMod. The second resistor Rs_Mod is connected in series with the capacitor C_Mod. The corresponding series connection is connected in parallel to the parallel resistor Rp. The electroabsorption modulator 20 is connected with so-called airbridges 13, 23, both on the input and output sides, which provide for the connection of the modulator 20 to the source 10 (not shown in FIG. 6) and the terminating impedance circuit 30, respectively. Additionally, a terminal pad 11 and a short piece of line 12 ("pad taper") for the connection between the modulator 20 and the source are provided as a description of a very short tapered RF coplanar line.

The terminal pad 11 may exemplarily exhibit the following parameters:
Tau (or $\tau$)=length/($c_0 \times 0.809$)
$Z_0$=9.82 ohm
$T_D$=0.27 ps
BCB (eps: 2.7): 3 µm thickness
Width W=60 µm
Eps or $\in$: =2.53
C=895 fF/mm
L=86.3 pH/mm
v/c=80.9% tau and $T_D$ describing the signal transit delay, $c_0$ describing the speed of light in a vacuum, $Z_0$ describing the characteristic impedance of the terminal pad 11, BCB being an abbreviation of benzocyclobutene and eps describing the relative dielectricity of the BCB or the dielectric. The material volume value of the relative dielectricity of BCB is 2.7. The somewhat smaller values 2.53 and 2.45 (see below for the short piece of line 12) take into consideration that the field lines in the microstrip lines on the BCB are, proportionately, also in air, i.e. decrease the relative dielectricity of BCB somewhat.

The short piece of line 12 (pad taper) may exemplarily exhibit the following parameters:
Tau (or $\tau$)=length/($c_0 \times 0.831$)
$Z_0$=16.3 ohm
$T_D$=0.4 ps
BCB (eps: 2.7): 3 µm
Length L=100 µm
Width W=33 µm
eps=2.45
C=476.6 fF/mm
L=126.5 pH/mm
v/c=83.1%

The airbridge 13 may exemplarily exhibit the following parameters:
Tau (or $\tau$)=length/($c_0 \times 0.831$)
$Z_0$=22 ohm
$T_D$=0.3 ps
L=6 pH
C=12 fF The airbridges 13 and 23 may each be modeled to have four terminals as "lines", wherein, on both the input side and the output side, one of the terminals each is connected to ground.

When looking at an exemplary equivalent circuit diagram of the electroabsorption modulator 20, the parallel resistor Rp_Mod of the electroabsorption modulator 20 may be assumed to be roughly 1 Mohm. The modulator capacitance C_Mod may be assumed to be roughly 0.2 pF.

The second resistor RS_Mod which is connected in series to the modulator capacitor may be assumed to be roughly 10 ohm.

A parallel stray capacitor Cp of, for example, roughly 3 fF may be arranged between the output-side airbridge 23 and the terminating impedance circuit 30.

The terminating impedance circuit 30 may exemplarily exhibit the following parameters:
C=0.0441 pF
Length=1.3 mm
W=3 µm
H=3 µm
Runtime=4.89 ps/mm
L=0.219 nH
R=38.6 ohm
G=1 µS (impedance values of the C, L, R, G elements per mm of line length, lossy 50 ohm CPW ("coplanar waveguide")).

On the output side, the RF delay line 35 may be connected to a series connection of a resistor 33 (Rterm) and a capacitor 38 (C_Block). The resistor Rterm may be assumed to be relatively small, roughly 0.01 ohm. The capacitor C_Block may exemplarily be assumed to exhibit a capacitance of roughly 100 nF.

Figure 7:
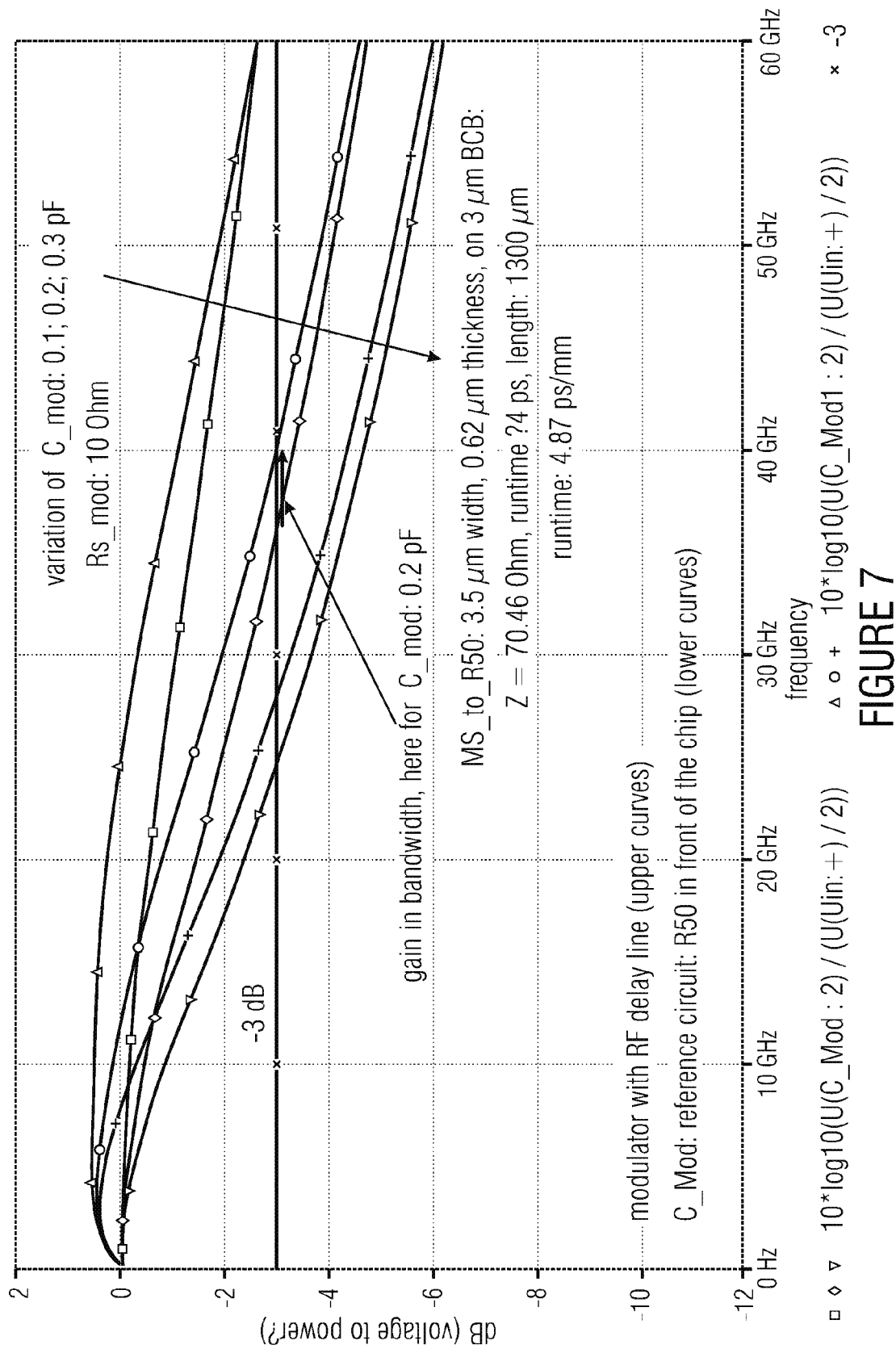
FIG. 7 shows a diagram comprising simulated frequency courses when using an inventive terminating impedance circuit and a 50 ohm terminating resistor; wherein three values are taken for the modulator capacitor Cmod and the respective increase in the frequency response of the inventive wiring is compared to a conventional-technology wiring comprising discrete components (single lumped 50 ohm resistor). The respective gain in bandwidth is apparent from the paired points of intersection of neighboring curves and the −3 dB line.

FIG. 7 shows a diagram of frequency courses of the electroabsorption modulator, which are optimized in the simulation when same is connected to a terminating impedance circuit in accordance with an embodiment. Paired simulated courses which would result with a wiring to only one 50 ohm terminating resistor can be seen for comparison.

FIG. 7 shows curves for different modulator capacitances C_Mod=0.1 pF, C_Mod=0.2 pF and C_Mod=0.3 pF. The second resistor Rs_Mod of the modulator 20 has been assumed to be 10 ohm. FIG. 7 clearly shows that, for a modulator capacitance of 0.2 pF, the frequency response experiences an increase in the relevant frequency range of 35 GHz to 40 GHz (center pair of curves including diamond and circle markings), when using the terminating impedance circuit suggested. When using a conventional 50 ohm resistor, the frequency response, however, decreases more strongly with an increasing frequency, namely the respective lower curve of the pair of curves. The advantageous effect of increasing on the frequency response compared to a solution containing only one standard 50 ohm terminating resistor becomes recognizable (see arrow at the example of Cmod=0.2 pF).

A 50 ohm terminating resistor R50 in front of the chip serves as a reference circuit (the respective lower curves: triangle (tip down), diamond, square).

The dimensioning of width, height and length of the microstrip line is indicated in dependence on the device parameters present.

Figure 8:
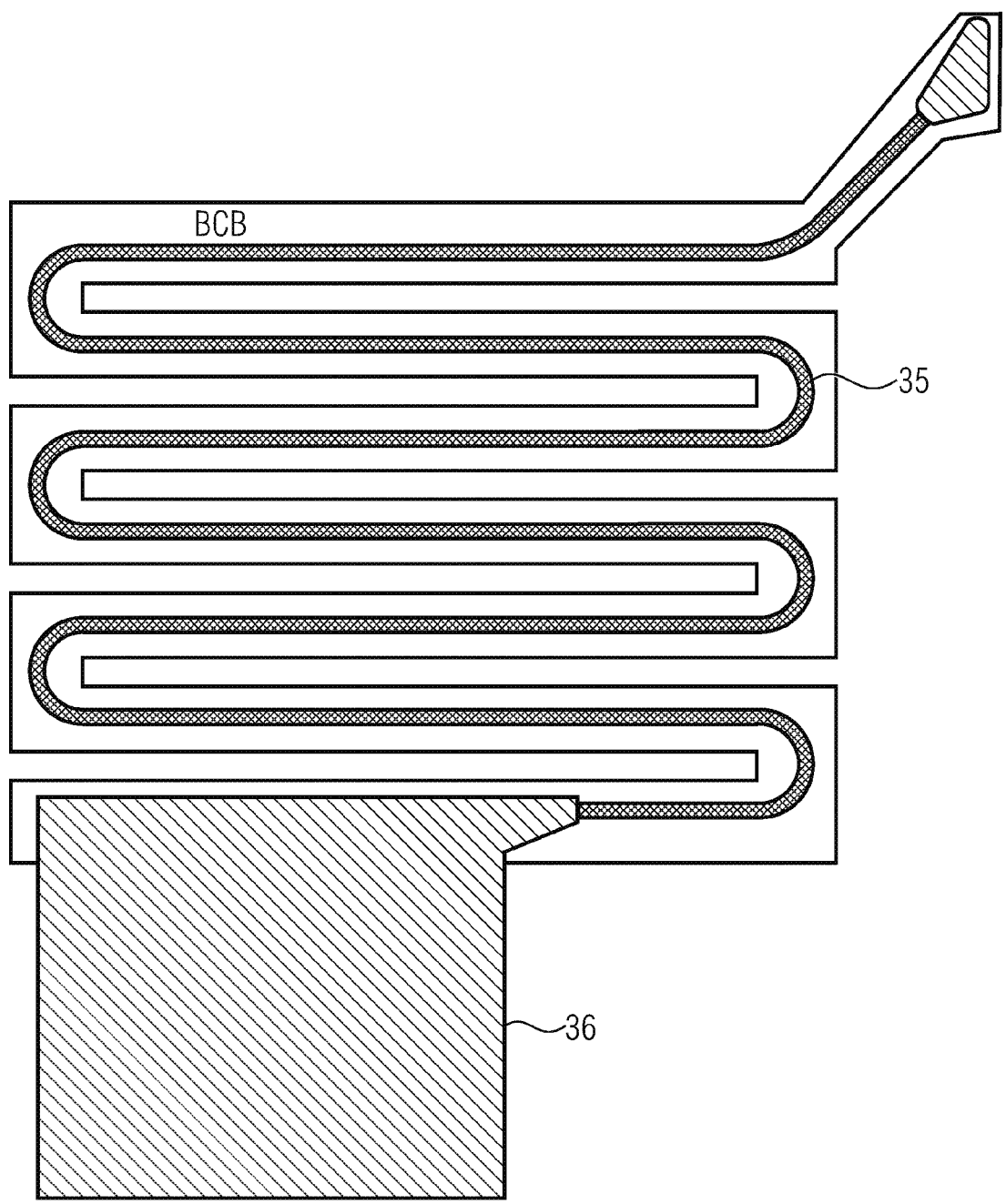
FIG. 8 shows a schematic top view of a technological realization of a terminating impedance circuit in accordance with embodiments of the present invention.

FIG. 8 schematically shows a top view of how the desired microstrip line 35 with a thickness of the dielectric, by BCB, of 3 μm may be realized by a metallization having a width of 3.5 μm at an overall length L=1300 μm (6×170 μm+3× 62.8 μm+91.5 μm). In particular, FIG. 8 shows a meandering shape of the RF delay line 35.

Some embodiments may contain a chip-internal small capacitor 37 to ground (see FIG. 4) instead of the short-circuit pad, the capacitor being connected in parallel to another external, larger capacitor 38 via a pad (see FIG. 5).

Some embodiments may contain a lateral tapering of the line's width, advantageously from narrow to broad, so as to further improve the frequency and impulse behaviors.

Relating to FIG. 9, the layer setup of the final microstrip line exemplarily is as follows:

| | | |
|---|---|---|
| Metallization (c) | Au | 167 nm |
| | Pt | 200 nm |
| | Ti | 20 nm |
| Dielectric (b) | SiNx | 150 nm |
| | BCB | 3470 nm |
| | SiNx | 200 nm |
| Substrate (a) | InP | |

Figure 9:
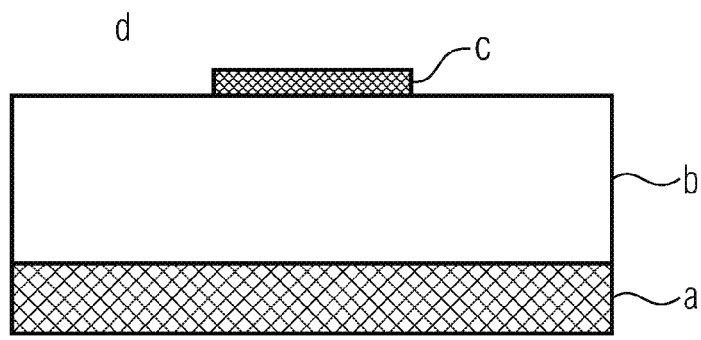
FIG. 9 shows a schematic cross-section of the series resistance-emphasized RF delay line.

FIG. 9 shows a schematic cross-sectional view of a series resistance-emphasized RF delay line 35 so as to illustrate the setup and the technological realization. The realization of the delay line presented in accordance with FIG. 3 is very well suitable for chip integration.

With an electrically conductive layer a, usually present, which corresponds to the ground potential, a potential setup as a microstrip line in accordance with FIG. 9 is possible. Here, the layer a may be conductive by a correspondingly high doping or by metallization.

The layer b is a dielectric, such as, e.g., a BCB material. When specifically dimensioning the microstrip line as regards width, height and length made of the material c, the desired ohmic and inductive components acting on the modulator may be realized.

An exemplary dimensioning is given in the embodiment below.

Figure 10:
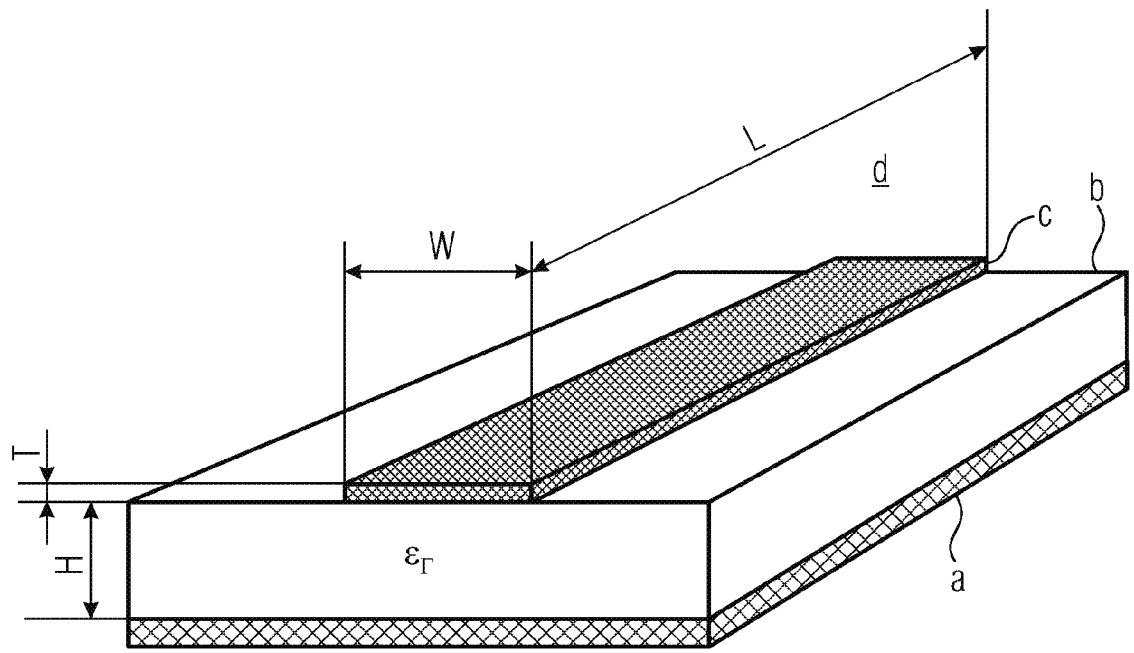
FIG. 10 shows a schematic perspective view of an RF delay line.

FIG. 10 shows a schematic perspective view of a microstrip line. In accordance with one embodiment, the dimensions illustrated therein may exemplarily be selected as follows:

Width W=3.5 μm
Height H=3 μm
Thickness T=0.38 μm
Length L=1300 μm
Relative dielectricity=2.7

With a frequency of 1 GHz, the following parameters will result for the microstrip line:

$Z_0$=82.46
electric length=0.006λ=2.2 degrees
Wavelength=210050.75 μm
$v_p$=0.701 c (c: speed of light)
$\epsilon_{\mathit{eff}}$=2.037
W/H=1.009

Apart from the desired capacitance per unit length, the dielectric advantageously provides for thermal decoupling of the distributed terminal resistor from the active components (laser, modulator).

The embodiments described before are a mere illustration of principles of the present invention. It is obvious that modifications and variations of arrangements and details described herein will be obvious for others skilled in the art. Therefore, the invention is intended to be limited solely by the scope of the following claims, but not the specific details having been presented using the description and the discussion of the embodiments.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device comprising:
    an electroabsorption modulator comprising a modulator capacitance, and
    a terminating impedance circuit connected in parallel to the electroabsorption modulator;
    wherein the terminating impedance circuit comprises an RF delay line comprising an impedance distributed over its length,
    wherein the spatially distributed impedance comprises a resistance per unit length, an inductance per unit length, and a parasitic capacitance per unit length,
    wherein the resistance per unit length and a line length of the RF delay line define a desired terminating impedance for the electroabsorption modulator,
    wherein the inductance per unit length and the line length of the RF delay line are selected to define, together with the modulator capacitance of the electroabsorption modulator, a damped resonant circuit system comprising a resonance frequency at a predefined value below an upper operating frequency limit of the electroabsorption modulator, thereby causing a controlled increase in the frequency response of the electroabsorption modulator within an operative frequency range,
    wherein the RF delay line is implemented to be a strip line, and
    wherein the RF delay line exhibits the following parameters:
    resistance per unit length between 20 kohm/m and 200 kohm/m,
    inductance per unit length between 100 nH/m and 1000 nHm,
    leakage per unit length smaller than 20 mS/mm, and
    capacitance per unit length between 10 pF/m and 200 pF/m.

2. The device in accordance with claim 1, comprising a dielectric for insulating the RF delay line both electrically and thermally from the electroabsorption modulator and/or a feeding laser source.

3. The device in accordance with claim 1, wherein the RF delay line comprises an input terminal which is connected to the electroabsorption modulator, and comprises an output-side short-circuit.

4. The device in accordance with claim 3, wherein the RF delay line and the output-side short-circuit are integrated monolithically or implemented together as a monolithic microwave circuit.

5. The device in accordance with claim 3, wherein the output-side short-circuit comprises an advantageously integrated capacitor or several parallel capacitors.

6. The device in accordance with claim 1, wherein the electroabsorption modulator and the terminating impedance circuit are integrated monolithically or implemented together as a monolithic microwave circuit.

7. The device in accordance with claim 1, wherein the strip line comprises a dielectric of a thickness between 0.1 µm and 10 µm and a relative permittivity $\in_r$ between 1.8 and 13.

8. The device in accordance with claim 1, wherein the RF delay line is of a meandering, serpentine or spiral implementation.

9. The device in accordance with claim 1, wherein the RF delay line comprises a broadening or tapering cross-section or width or comprises a stepped line tapering.

10. The device in accordance with claim 1, wherein the RF delay line comprises a length of at least 1/10 of the wavelength at the upper operating frequency limit of the electroabsorption modulator.

11. The device in accordance with claim 1, wherein the RF delay line comprises at least one of the following materials: gold, titanium, platinum, silver, nickel, chromium, tungsten.

12. The device in accordance with claim 1, wherein the RF delay line is realized alternatingly in sections over its length on a dielectric and in the form of airbridges.

13. The device in accordance with claim 1, wherein the parameters of the RF delay line are selected such that a resonance-distributed system, which comprises the electroabsorption modulator and the RF delay line, comprises a quality factor $Q<1$.

* * * * *